(12) United States Patent
Yonezawa et al.

(10) Patent No.: US 9,753,216 B2
(45) Date of Patent: Sep. 5, 2017

(54) MULTIMODE OPTICAL FIBER AND OPTICAL CABLE INCLUDING THE SAME

(71) Applicant: SUMITOMO ELECTRIC INDUSTRIES, LTD., Osaka-shi, Osaka (JP)

(72) Inventors: Kazuhiro Yonezawa, Yokohama (JP); Tadashi Enomoto, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/837,206

(22) Filed: Aug. 27, 2015

(65) Prior Publication Data

US 2017/0059773 A1    Mar. 2, 2017

(51) Int. Cl.
*G02B 6/028* (2006.01)
*G02B 6/036* (2006.01)
*G02B 6/02* (2006.01)

(52) U.S. Cl.
CPC ....... *G02B 6/0288* (2013.01); *G02B 6/02214* (2013.01); *G02B 6/03627* (2013.01); *G02B 6/03694* (2013.01)

(58) Field of Classification Search
CPC .............. G02B 6/0288; G02B 6/02214; G02B 6/03627; G02B 6/03694
USPC ........................................................ 385/124
See application file for complete search history.

(56) References Cited

U.S. PATENT DOCUMENTS

| | | | |
|---|---|---|---|
| 6,788,397 B1 * | 9/2004 | Golowich | G01M 11/33 356/121 |
| 7,817,257 B2 | 10/2010 | Takenaga et al. | |
| 2011/0037183 A1 * | 2/2011 | Tudury | G02B 6/0288 264/1.28 |
| 2012/0192593 A1 * | 8/2012 | Haruna | C03B 37/01211 65/430 |
| 2013/0302000 A1 * | 11/2013 | Yonezawa | G02B 6/0281 385/123 |

FOREIGN PATENT DOCUMENTS

WO    WO-2005/071381 A1    8/2005

* cited by examiner

*Primary Examiner* — Jerry Blevins
(74) *Attorney, Agent, or Firm* — Drinker Biddle & Reath LLP

(57) ABSTRACT

An embodiment of the invention relates to a MMF with a structure for enabling stable manufacture of the MMF suitable for wide-band multimode optical transmission, for realizing faster short-haul information transmission than before. In the MMF, when an input position of a DMD measurement pulse on an input end face is represented by a distance r from a center of a core with a radius a, a power of the DMD measurement pulse on an output end face with the input position r of the DMD measurement pulse being 0.8a is not more than 70% of a power of the DMD measurement pulse on the output end face with the input position r of the DMD measurement pulse being 0.

20 Claims, 10 Drawing Sheets

MULTIMODE OPTICAL FIBER AND OPTICAL CABLE INCLUDING THE SAME

BACKGROUND OF THE INVENTION

Field of the Invention

The present invention relates to a multimode optical fiber (hereinafter referred to as MMF: MultiMode optical Fiber) and an optical cable including the same.

Related Background Art

The MMF is widely used for short-haul information transmission like LAN (Local Area Network) because it is easy to establish fiber-fiber connection and it becomes feasible to readily construct a network by making use of low-demand-performance equipment.

Specifically, the MMF is used in relatively-short-haul communication networks with large communication capacity, e.g., communication in a data center. Particularly, it is believed that there will be increasing demands for MMFs satisfying OM3 (A1a.2) and OM4 (A1a.3) Standards of ISO/IEC11801, which are suitable for fast communication. The bandwidths as most important characteristics of the foregoing MMFs are generally evaluated by DMD (Differential Mode Delay) measurement as shown in IEC60793-1-49 ed2.0.

SUMMARY OF THE INVENTION

The Inventors conducted research on the conventional MMFs and found the problem as described below.

Namely, a refractive index profile of a core in a MMF (indicating refractive indices at respective portions on a straight line corresponding to the diameter of the core, which is perpendicular to the central axis of the MMF) has a dome shape called an α-power refractive index profile and the bandwidth as most important characteristic in the MMF rapidly varies even with slight variation in the α value which determines the shape of the foregoing α-power refractive index profile. Therefore, the broad-band MMFs satisfying the OM3 and OM4 Standards of ISO/IEC11801 have extremely small tolerance for the α-value variation, which is a major factor to determine production yield.

Specifically, if in a manufactured MMF the α value deviates from a designed optimum value (value by which the shape of the refractive index profile of the core is optimized for a predetermined wavelength), intermodal dispersion between the fundamental mode and a higher-order mode will increase. Namely, it can be confirmed by the DMD measurement that in a core cross section there is a large group delay difference between an inside region (hereinafter referred to as inside core region) and an outside region (hereinafter referred to as outside core region). Furthermore, an increase in the group delay difference between the inside core region and the outside core region means bandwidth degradation.

The present invention has been accomplished to solve the problem as described above and it is an object of the present invention to provide a MMF having a structure for enabling stable manufacture of the MMF suitable for wide-band multimode optical transmission, in order to realize faster short-haul information transmission than before.

It is noted that in the present specification, a simple expression of "optical fiber" without any particular note shall mean "multimode optical fiber (MMF)." The MMF according to an embodiment of the present invention concerns a GI (Graded Index) type MMF (hereinafter referred to as GI-MMF) and is definitely differentiated from the single-mode optical fiber (hereinafter referred to as SMF) for long-haul transmission by structure. The GI-MMF has a general structure composed of a high-refractive-index core and a low-refractive-index cladding. The MMF according to the embodiment of the present invention also includes a MMF having the structure common to the GI-MMF and provided with a trench part of a low refractive index located between the core and the cladding (referred to as BI-MMF: Bend-Insensitive MultiMode optical Fiber). The trench part has the lower refractive index than the cladding and provides the MMF with macro-bending resistance property.

A MMF according to an embodiment of the present invention, when configured as a GI-MMF, comprises: an input end face; an output end face opposed to the input end face; a core extending from the input end face to the output end face; and a cladding provided on an outer peripheral surface of the core. A MMF according to an embodiment of the present invention, when configured as a BI-MMF, comprises: an input end face; an output end face opposed to the input end face; a core extending from the input end face to the output end face; a cladding provided on an outer peripheral surface of the core; and a trench part provided between the core and the cladding. In both of the GI-MMF and the BI-MMF, the core has an outer diameter 2a and has an α-power refractive index profile. The trench part in the BI-MMF has a lower refractive index than the cladding. Particularly, in the embodiment of the invention, each of the GI-MMF and the BI-MMF is configured as follows: in the DMD measurement, when an input position of a measurement pulse on the input end face is represented by a distance r from a center of the core, a power of the measurement pulse on the output end face with the input position r of the measurement pulse being 0.8a is not more than 70% of a power of the measurement pulse on the output end face with the input position r being 0. The power of the measurement pulse can be confirmed by the DMD measurement and in the present specification the power of the measurement pulse means a time integral value of a measuring device for measuring the pulse intensity per given time (e.g., an integral value of an oscilloscope waveform on the vertical axis of pulse intensity and the horizontal axis of time).

Each of embodiments according to the present invention will become more fully understood from the detailed description given hereinbelow and the accompanying drawings. These embodiments are presented by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, and it is apparent that various modifications and improvements within the scope of the invention would be obvious to those skilled in the art from this detailed description.

DETAILED DESCRIPTION OF EMBODIMENTS

Each of embodiments of the present invention will be described below in detail with reference to the accompanying drawings. The same elements will be denoted by the same reference signs in the description of the drawings, without redundant description.

Figure 1A:
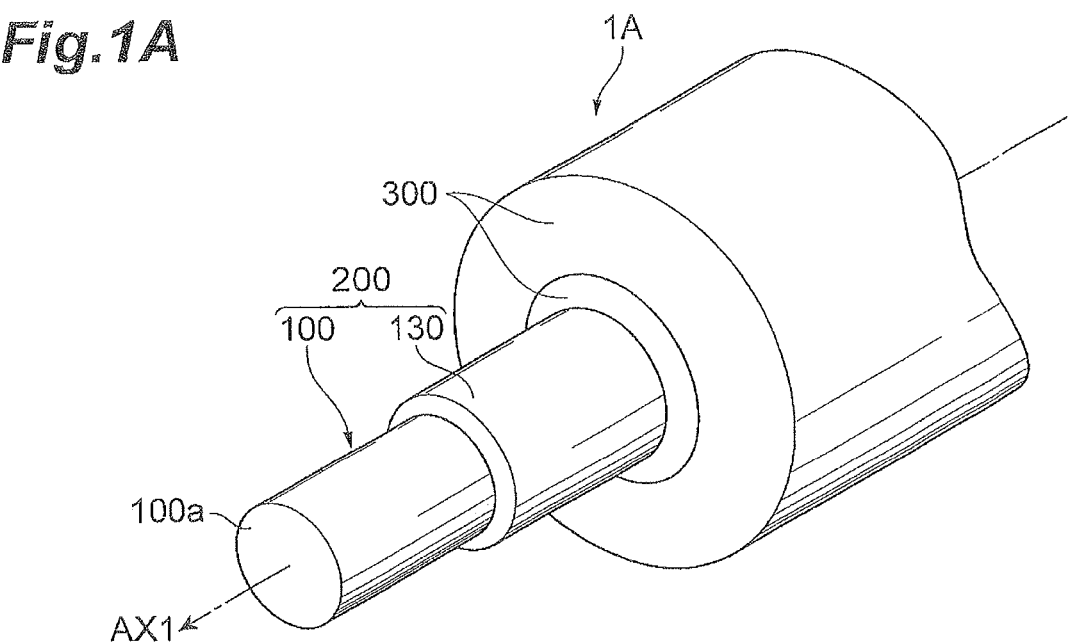
FIG. 1A to FIG. 1C are drawings showing various configuration examples of optical cables according to the embodiment of the invention.
Figure 1B:
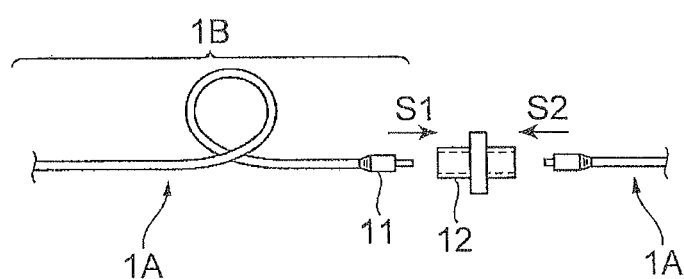
Figure 1C:
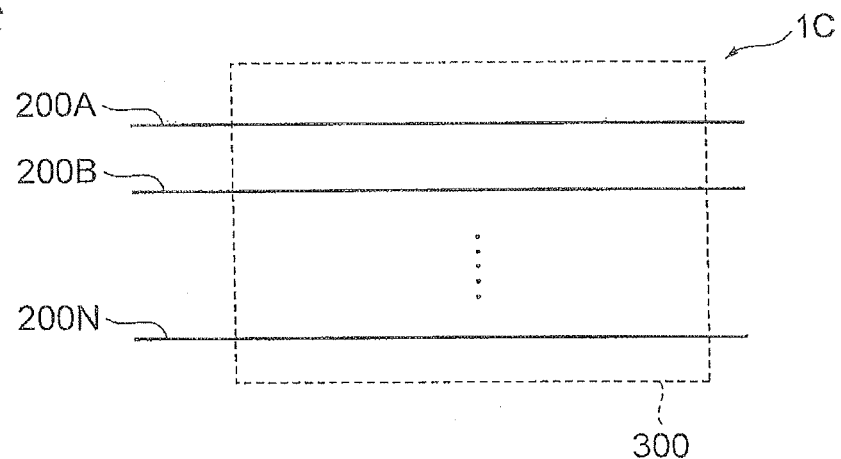

FIG. 1A to FIG. 1C show various configuration examples of optical cables according to the embodiment of the invention, wherein FIG. 1A shows a cross-sectional structure of an optical cable including a MMF as an example of the optical cable according to the embodiment of the invention. FIG. 1B shows an optical cord in which a connector is attached to a tip portion of a MMF, as another example of the optical cable according to the embodiment of the invention, and the optical cord of this kind is also included in the optical cable according to the embodiment of the invention. FIG. 1C is a drawing showing a schematic configuration of an optical cable including a plurality of MMFs, as still another example of the optical cable according to the embodiment of the invention.

Specifically, the optical cable 1A in FIG. 1A includes a MMF 100 (glass part comprised of silica glass) according to the embodiment of the invention, which extends along the optical axis AX1, and a resin coat 130, which is coated during drawing of an optical fiber preform. The MMF 100 has an input end face 100a, and an output end face 100b (cf. FIG. 3A) opposed to the input end face 100a, and these MMF 100 and resin coat 130 constitute a coated optical fiber 200. The optical cable 1A is further provided with a cable jacket 300 disposed on the outer periphery of the coated optical fiber 200. The cable jacket 300 is composed of one or more resin layers.

The optical cable 1B in FIG. 1B has a form of an optical cord and in the example of FIG. 1B the optical cable 1A in FIG. 1A is applied to a part of the optical cord. Namely, the optical cable 1B is an optical cord provided with the optical cable 1A and with a connector 11 attached to a tip portion of the MMF 100 from which the cable jacket 300 has been removed. The optical cable 1B having this structure is optically connected to another optical cord through a sleeve 12 for position alignment. Namely, as shown in FIG. 1B, the connector 11 of the optical cord being the optical cable 1B is inserted through one slot into the sleeve 12 along a direction indicated by an arrow S1 in the drawing. On the other hand, a connector of another optical cord is also inserted through the other slot into the sleeve 12 along a direction indicated by an arrow S2. In this manner, optical connection is achieved between the MMF 100 in the optical cord of optical cable 1B and the MMF in the other optical cord.

Furthermore, the optical cable according to the embodiment of the invention also includes the optical cable 1C including the plurality of MMFs 200A to 200N as shown in FIG. 1C. The optical cable 1C may have a tape shape in which the plurality of MMFs 200A to 200N are integrally fixed by a cable coating (resin) while being arranged on the same plane, and an optical cord wherein connectors are attached to these MMFs 200A to 200N is also included in the optical cable 1C.

The MMF 100 according to the embodiment of the invention has a configuration for effectively suppressing the bandwidth degradation of the MMF 100 due of deviation of the shape of the refractive index profile of the core from the ideal shape. Specifically, the configuration lowers the dependence of the bandwidth of the MMF on the shape of the refractive index profile of the core and, even with increase in the group delay difference between the inside core region and the outside core region, the power of propagating light is attenuated in the outside core region, so as to suppress influence on the transmission bandwidth. This suppression effect can be confirmed by the DMD measurement to compare power at respective portions on the output end face 100b of the MMF 100.

In general, in the case of the MMF wherein the α value for defining the shape of the α-power refractive index profile of the core deviates from an optimum value at a use wavelength, intermodal dispersion between the fundamental mode and a higher-order mode becomes larger. However, even if there is a higher-order mode which causes great intermodal dispersion with the fundamental mode, it cannot be a factor to degrade the bandwidth unless the higher-order mode propagates up to a receiver because of leakage or attenuation in a process of propagation in the MMF. Even if such a higher-order mode reaches the receiver, the degree of the bandwidth degradation will be insignificant if the arriving higher-order mode is sufficiently attenuated. Furthermore, when the α value deviates from the optimum value, a mode propagating in the outside core region is more likely to demonstrate greater intermodal dispersion with the fundamental mode. If the MMF demonstrates noticeable leakage or attenuation of modes propagating in the outside core region, the bandwidth degradation will be reduced even with some deviation of the α value of the core profile from the optimum value, thereby gaining the advantage of maintaining the quality of wide-band multimode optical transmission. Furthermore, the optimum α value also varies depending on the use wavelength. For this reason, the transmission bandwidth also has dependence on the wavelength of propagating light and the MMF as described above must be able to maintain a wide bandwidth enough for use. This means that it becomes easier to manufacture the MMFs satisfying the OM3 (A1a.2) and OM4 (A1a.3) Standards of ISO/IEC11801, suitable for fast communication.

In passing, the MMF satisfying the OM3 Standard refers to a fiber that has the bandwidth called Effective Modal Bandwidth (EMB), of not less than 2000 MHz·km and the bandwidths in all-mode excitation (OFL (Over Filled Launch) bandwidth defined by International Standards IEC60793-1-41) of not less than 1500 MHz·km at 850 nm and not less than 500 MHz·km at 1300 nm. In the OM3 Standard, the MMF needs to satisfy the three conditions (OM3-1 to OM3-3) below.

EMB (850 nm)≥2000 MHz·km          (OM3-1)

OFL bandwidth (850 nm)≥1500 MHz·km          (OM3-2)

OFL bandwidth (1300 nm)≥500 MHz·km          (OM3-3)

In the OM4 Standard, the MMF needs to satisfy the three conditions (OM4-1 to OM4-3) below.

EMB (850 nm)≥4700 MHz·km          (OM4-1)

OFL bandwidth (850 nm)≥3500 MHz·km          (OM4-2)

OFL bandwidth (1300 nm)≥500 MHz·km          (OM4-3)

It is known as an example that about a hundred modes propagate in the MMF with the core diameter of 50 μm and the relative refractive-index difference $\Delta_{core}$ of about 1% at the core center, but there is no specific index for measuring leakage or attenuation of individual modes. Then the Inventors considered that it should be effective to evaluate a radial distribution of pulse power on the output end face of MMF in the DMD measurement, as an index to figure out a level of leakage or attenuation of higher-order modes. Specifically, the MMF 100 according to the embodiment of the invention, which is either the GI-MMF or the BI-MMF, has a characteristic light power distribution which can be confirmed by the DMD measurement. Namely, the MMF according to the embodiment of the invention is characterized in that when an input position of a measurement pulse on the input end face is represented by a distance r from the center of the core with the diameter 2a, the power of the measurement pulse on the output end face with the input position r of the measurement pulse being 0.8a is not more than 70% and preferably not more than 40% of the power of the measurement pulse on the output end face with the input position r of the measurement pulse being 0. It is noted in the present specification that in the core with the diameter 2a, a region where the distance r from the core center falls within the range of 0.8a to a corresponds to the outside core region. In the aforementioned example, the region with the core radii from 20 μm to 25 μm is the outside core region and the region surrounded by the outside core region is the inside core region.

As preferred optical characteristics at the wavelength 850 nm of the MMF 100 according to the embodiment of the invention, the OFL bandwidth is not less than 1500 MHz·km and the EMB is not less than 2000 MHz·km. As more preferred optical characteristics at the wavelength 850 nm, the OFL bandwidth is not less than 3500 MHz·km and the EMB is not less than 4700 MHz·km. As preferred optical characteristics at both of the wavelength 850 nm and the wavelength 950 nm of the MMF according to the embodiment of the invention, the EMB at the wavelength 850 nm is not less than 4700 MHz·km and the EMB at the wavelength 950 nm is not less than 2700 MHz·km. As a preferred optical characteristic at any one of the wavelengths 980 nm, 1060 nm, and 1300 nm of the MMF 100 according to the embodiment of the invention, the OFL bandwidth is not less than 1500 MHz·km. As a more preferred optical characteristic at any one of the wavelengths 980 nm, 1060 nm, and 1300 nm, the OFL bandwidth is not less than 3500 MHz·km.

For obtaining the optical characteristics as described above, the MMF 100 according to the embodiment of the invention has a structure for attenuating light propagating at least through the outside core region in the core, or, for leaking such outside propagating light from the core into the cladding. Various means can be applied to the structure for selectively attenuating or leaking the outside propagating light in the core and a preferred example of such structure is, for example, a structure in which at least a part of a glass region surrounding the outer peripheral surface of the core and being different from the core is doped with a transition metal element.

(DMD Measurement)

Figure 2:
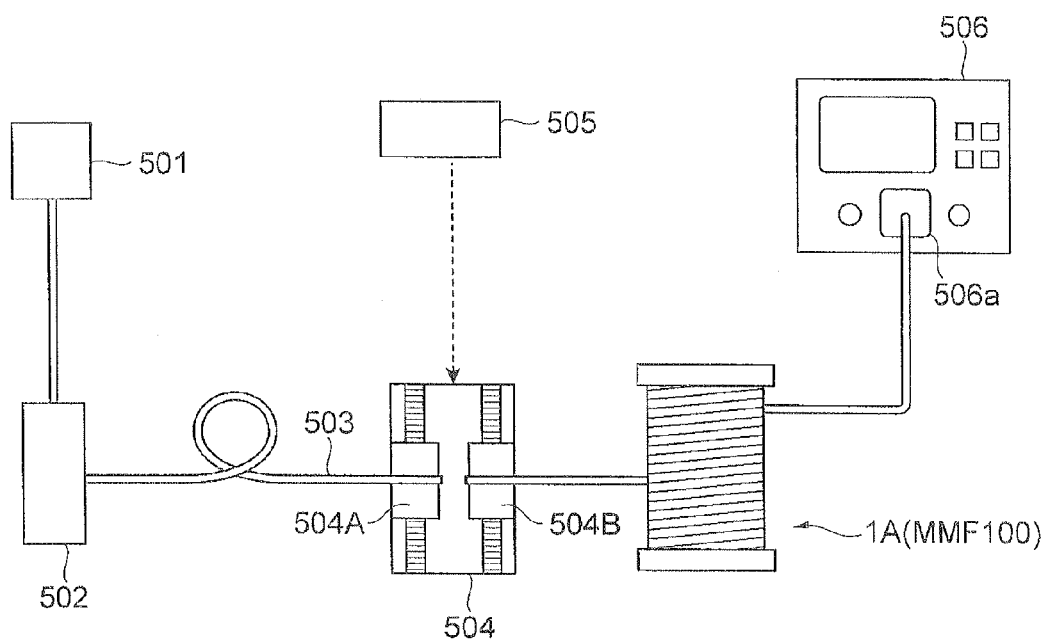
FIG. 2 is a drawing showing a schematic configuration of a device for performing the DMD measurement (DMD measurement device).

The DMD measurement will be described below in detail using the accompanying drawings. FIG. 2 is a drawing showing a schematic configuration of a DMD measurement device. FIGS. 3A to 3D are drawings for explaining the principle of the DMD measurement.

The DMD measurement device in FIG. 2 is a device that measures pulse responses of the MMF while giving offsets in the radial direction of the MMF to a very limited excitation spot on the input end face of the MMF as an object to be measured. FIG. 2 shows the optical cable 1A including the MMF 100 of the measured object, as an example.

Figure 3A:
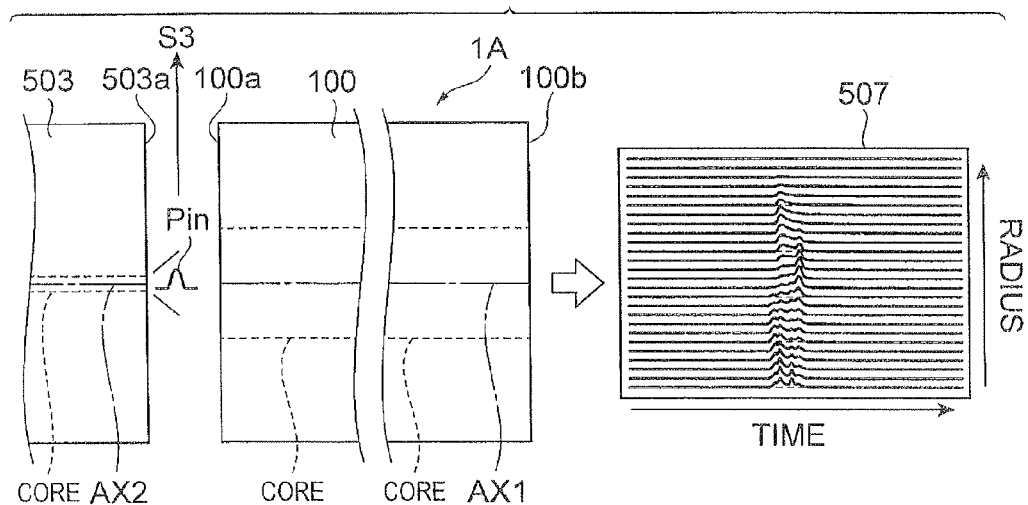
FIG. 3A to FIG. 3D are drawings for explaining the principle of the DMD measurement by the device shown in FIG. 2.

The DMD measurement device, as shown in FIG. 2, is provided with a light source 501, a variable light attenuator 502, an SMF (excitation fiber) 503, a fiber center aligner 504, a control unit 505, an oscilloscope 506, and an O/E converter 506a. The light source 501 outputs a measurement pulse. The variable light attenuator 502 regulates the light quantity of the measurement pulse from the light source 501. The SMF 503, as shown in FIG. 3A, guides the measurement pulse from the variable light attenuator 502 so as to apply the measurement pulse from an output end face 503a to a predetermined position on the input end face 100a of the MMF 100 (included in the optical cable 1A). The fiber center aligner 504 fixes the output end face 503a of the SMF 503 and the input end face 100a of the MMF 100 at respective predetermined positions. The control unit 505 controls the fiber center aligner 504 to adjust relative positions of the output end face 503a of the SMF 503 and the input end face 100a of the MMF 100. The O/E converter 506a converts the intensity waveform of the measurement pulse from the output end face 100b of the MMF 100 into an electric signal. The oscilloscope 506 generates an intensity waveform of the measurement pulse, based on the electric signal from the O/E converter 506a. The fiber center aligner 504 is provided with a stage 504A to which a tip portion of the SMF 503 including the output end face 503a is fixed and with a stage 504B to which a tip portion of the MMF 100 including the input end face 100a is fixed. The control unit 505 adjusts respective positions of the stages 504A and 504B of the fiber center aligner 504, so as to give the offsets in the radial direction of the MMF 100 indicated by an arrow S3 to the excitation spot (the input position of the measurement pulse) on the input end face 100a of the MMF 100.

Figure 3B:
Figure 3C:
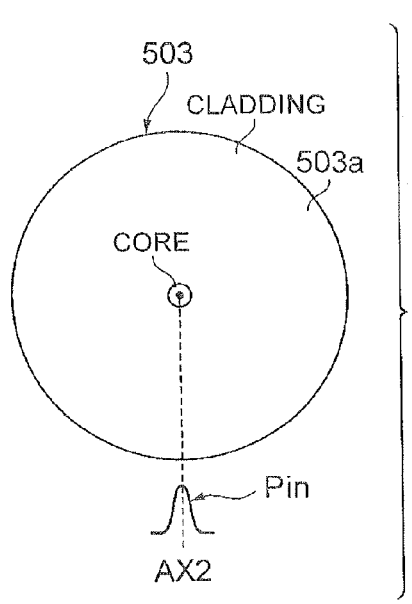
Figure 3D:
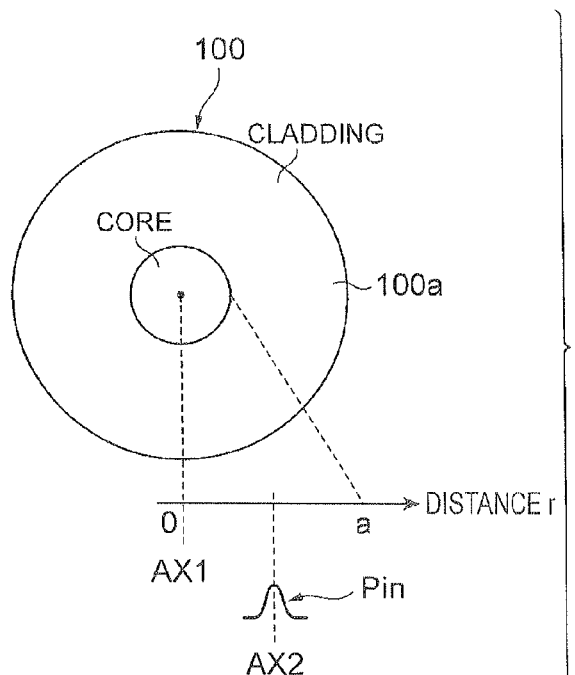

Specifically, in the DMD measurement, as shown in FIG. 3A, the fiber center aligner 504 adjusts the relative positions of the output end face 503a of the SMF 503 extending along the optical axis AX2 and the input end face 100a of the MMF 100 extending along the optical axis AX1, according to an instruction signal from the control unit 505. Namely, the measurement pulse $P_{in}$ having the intensity peak at the core center (coincident with the optical axis AX2) is output from the output end face 503a of the SMF 503, as shown in FIG. 3C. On the other hand, on the input end face 100a of the MMF 100, as shown in FIG. 3D, the intensity peak of the measurement pulse $P_{in}$ is given the offset in the radial direction (direction indicated by the arrow S3 in FIG. 3A) from the core center (coincident with the optical axis AX1). Intensity waveform of the measurement pulse $P_{out}$ on the output end face 100b of the MMF 100 is converted into an electric signal by the O/E converter 506a and the electric signal is taken into the oscilloscope 506 to obtain an intensity distribution 507 of the measurement pulse PA as shown in FIG. 3A. The intensity distribution 507 is composed of oscilloscope waveforms of the measurement pulse $P_{out}$ corresponding to respective input positions of $P_{in}$, where time is represented by the horizontal axis and core radial position of input of the measurement pulse $P_{in}$ by the vertical axis. An oscilloscope waveform with each $P_{in}$ input position is the shape as shown in FIG. 3B (where the vertical axis represents intensity and the horizontal axis represents time) and in the present specification an integral value (area) of this oscilloscope waveform means the power of the measurement pulse $P_{out}$ on the output end face 100b of the MMF 100.

(MMF of First Embodiment)

Figure 4A:
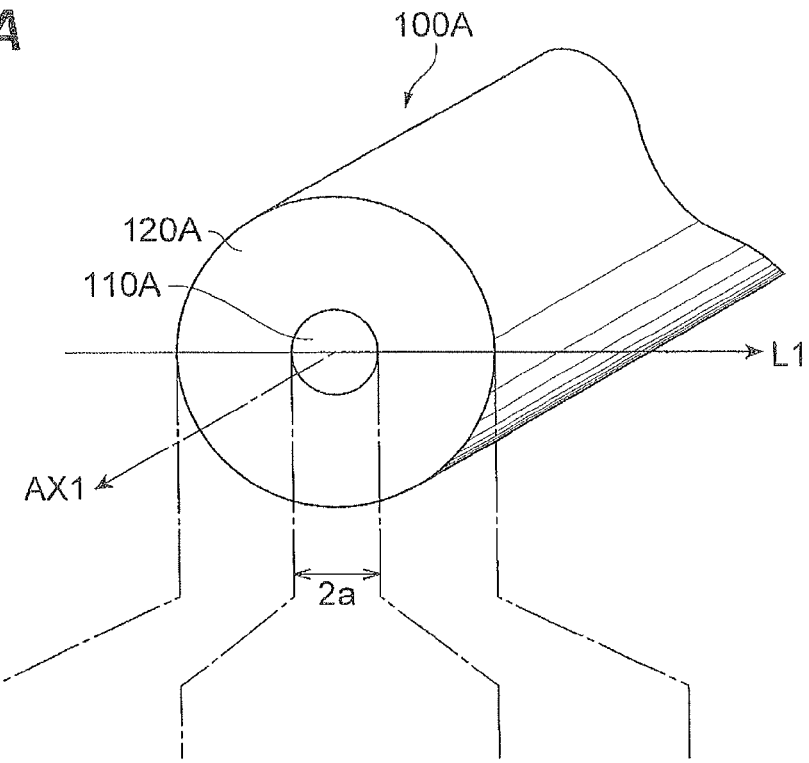
FIG. 4A and FIG. 4B are drawings showing a cross-sectional structure and a refractive index profile of a GI-MMF according to the embodiment of the invention.
Figure 4B:
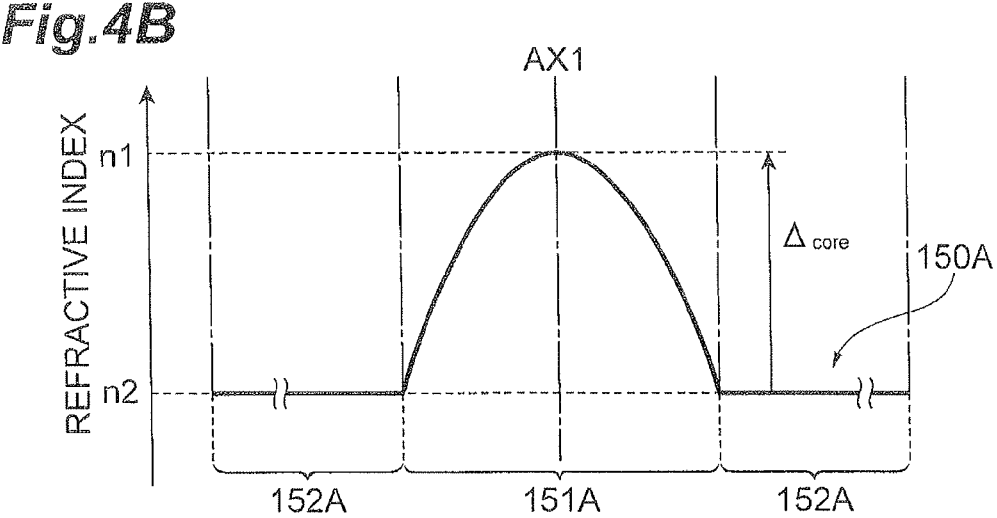

FIG. 4A is a drawing showing a cross-sectional structure of a GI-MMF 100A according to the first embodiment and FIG. 4B is a refractive index profile thereof. This GI-MMF 100A is applicable to any one of the optical cables 1A to 1C shown in FIGS. 1A to 1C.

The GI-MMF 100A, as shown in FIG. 4A, is provided with a core 110A extending along the optical axis AX1 and a cladding 120A provided on the outer periphery of the core 110A. In the GI-MMF 100A shown in FIG. 4A, the core 110A is doped with $GeO_2$ for adjusting the shape of the refractive index profile and has the maximum refractive index n1. The cladding 120A is pure silica or a glass region doped with an impurity for adjustment of refractive index and has the refractive index n2 (n2<n1) lower than the maximum refractive index n1 of the core 110A.

The refractive index profile 150A of the GI-MMF 100A shown in FIG. 4B indicates the refractive indices at respective portions on a line L1 (coincident with the radial direction of the GI-MMF 100A) perpendicular to the optical axis AX1 and, more specifically, a region 151A indicates the refractive indices at respective portions of the core 110A along the line L1 and a region 152A does the refractive indices at respective portions of the cladding 120A along the line L1.

Particularly, the region 151A in the refractive index profile 150A in FIG. 4B has a dome shape in which the refractive index becomes maximum at the center of the core 110A where the refractive index n(r) coincides with the optical axis AX1 (a position where the optical axis AX1 intersects with the cross section of the GI-MMF 100A), as expressed by Expression (1) below (α-power refractive index profile). The n(r) is the refractive index of the core 110A with the radius a (or the diameter 2a) and represents the refractive index at the position r away in the radial direction from the center of the core 110A. Therefore, concentrations of $GeO_2$ doped for adjustment of refractive index also steeply decrease from the center of the core 110A toward the adjacent cladding 120A. The α value for defining this dome shape is from 1.8 to 2.2. The relative refractive-index difference $\Delta_{core}$ of the center of the core 110A to the cladding 120A (which corresponds to the maximum relative refractive-index difference of the core 110A to the cladding 120A) is from 0.8 to 2.4%. The diameter of the core 110A is from 25 to 65 μm. In the present specification, the same core structure also applies to the structure of the core in each of embodiments, comparative example, and others described below. The relative refractive-index difference $\Delta_{core}$ of the core 110A (refractive index n1) to the cladding 120A (refractive index n2) is defined by Expression (2) below. The following definition of the relative refractive-index difference is also applied to the other embodiments.

$$n(r) = n1\left(1 - 2\Delta_{core}\left(\frac{r}{a}\right)^\alpha\right)^{1/2} \quad (0 \le r \le a) \quad (1)$$

$$\Delta_{core} = \frac{(n1^2 - n2^2)}{2n1^2} \quad (2)$$

(MMF of Second Embodiment)

Figure 5A:
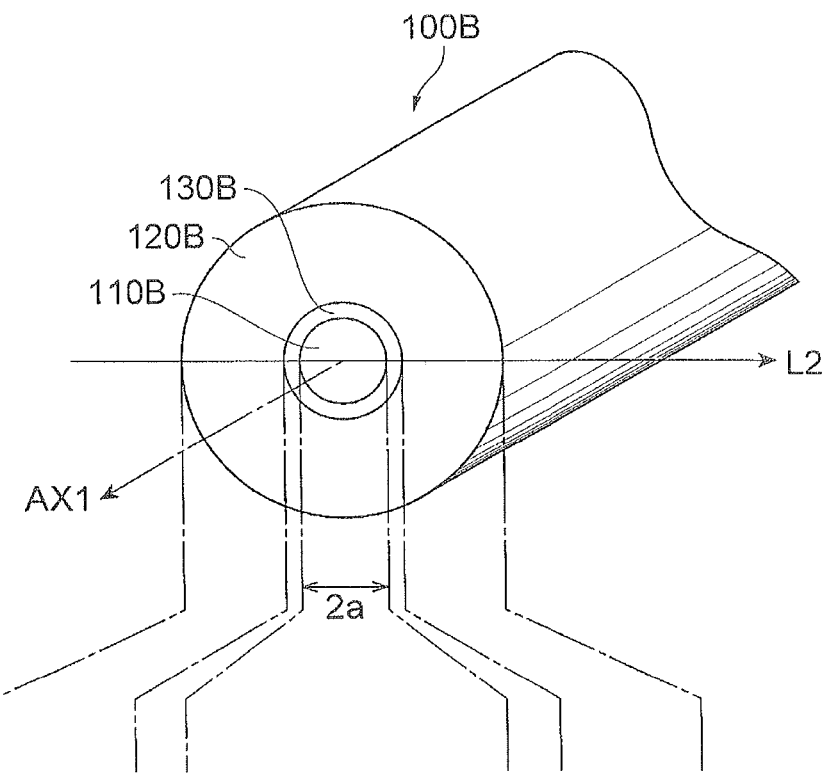
FIG. 5A and FIG. 5B are drawings showing a cross-sectional structure and a refractive index profile of a BI-MMF according to the embodiment of the invention.
Figure 5B:
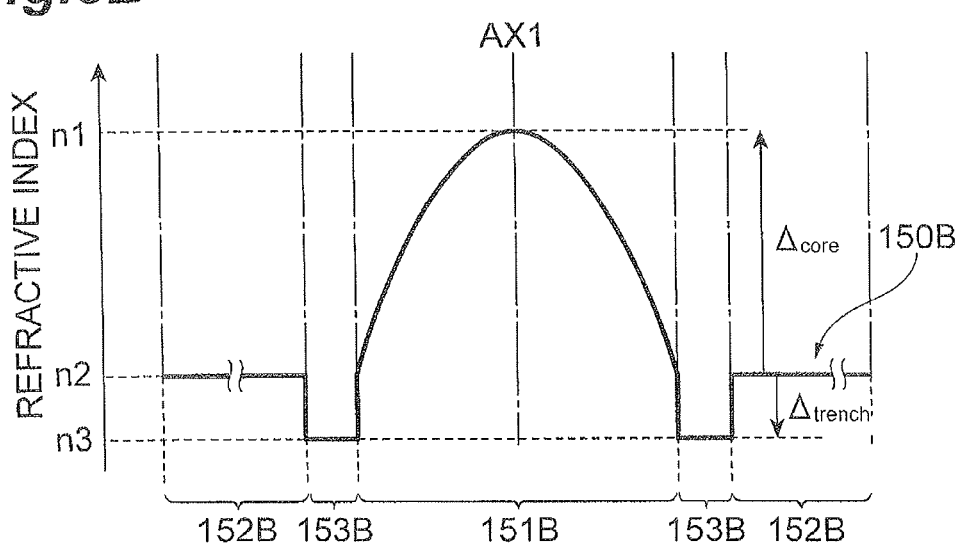

FIG. 5A is a drawing showing a cross-sectional structure of a BI-MMF 100B according to the second embodiment and FIG. 5B is a refractive index profile thereof. This BI-MMF 100B is applicable to any one of the optical cables 1A to 1C shown in FIGS. 1A to 1C.

The BI-MMF 100B, as shown in FIG. 5A, is provided with a core 110B extending along the optical axis AX1, a cladding 120B provided on the outer periphery of the core 110B, and a trench part 130B provided between the core 110B and the cladding 120B. In the BI-MMF 100B shown in FIG. 5A, the core 110B is doped with $GeO_2$ for adjusting the shape of the refractive index profile and has the maximum refractive index n1. The trench part 130B is doped with a refractive index decreasing agent such as fluorine, for providing the BI-MMF 100B with macro-bending resistance property and has the refractive index n3 (<n1). The cladding 120B is pure silica or a glass region doped with an impurity for adjustment of refractive index and has the refractive index n2 lower than the maximum refractive index n1 of the core 110B and higher than that of the trench part 130B (n3<n2<n1).

The refractive index profile 150B of the BI-MMF 100B shown in FIG. 5B indicates the refractive indices at respective portions on a line L2 (coincident with the radial direction of the BI-MMF 100B) perpendicular to the optical axis AX1 and, more specifically, a region 151B indicates the refractive indices at respective portions of the core 110B along the line L2, a region 152B does the refractive indices at respective portions of the cladding 120B along the line L2, and a region 153B does the refractive indices at respective portions of the trench part 130B along the line L2.

Particularly, the region 151B in the refractive index profile 150B in FIG. 5B has the α-power refractive index profile given by the aforementioned Expression (1). The refractive index n(r) is the refractive index of the core 110B with the radius a and represents the refractive index at the position r away in the radial direction from the center of the core 110B. Therefore, concentrations of $GeO_2$ doped for adjustment of refractive index also steeply decrease from the center of the core 110B toward the adjacent trench part 130B. The α value for defining the shape of this α-power refractive index profile is from 1.8 to 2.2. The relative refractive-index difference $\Delta_{core}$ of the center of the core 110B to the cladding 120B, which is defined by the foregoing Expression (2), is from 0.8 to 2.4%. The diameter of the core 110B is from 25 to 65 μm. The foregoing core structure is the same as the structure of the core in the first embodiment (FIGS. 4A and 4B). The relative refractive-index difference $\Delta_{trench}$ of the trench part 130B (refractive index n3) to the cladding 120A (refractive index n2) is defined by Expression (3) below.

$$\Delta_{trench} = \frac{(n3^2 - n2^2)}{2n3^2} \quad (3)$$

(Evaluation)

The following will describe the evaluation results of the higher-order mode removal function in the outside core region and the bandwidth stability with two samples of GI-MMF 100A (embodiment samples) as MMF 100 of the embodiment of the invention and a sample of GI-MMF according to a comparative example (comparative sample) which were prepared for the evaluation. Although the below description explains the samples of GI-MMF, the same evaluation results would be expected with the BI-MMF shown in FIGS. 5A and 5B because the shape of the core is the same. For this reason, the evaluation on the BI-MMF will be omitted in the following description.

Figure 6A:
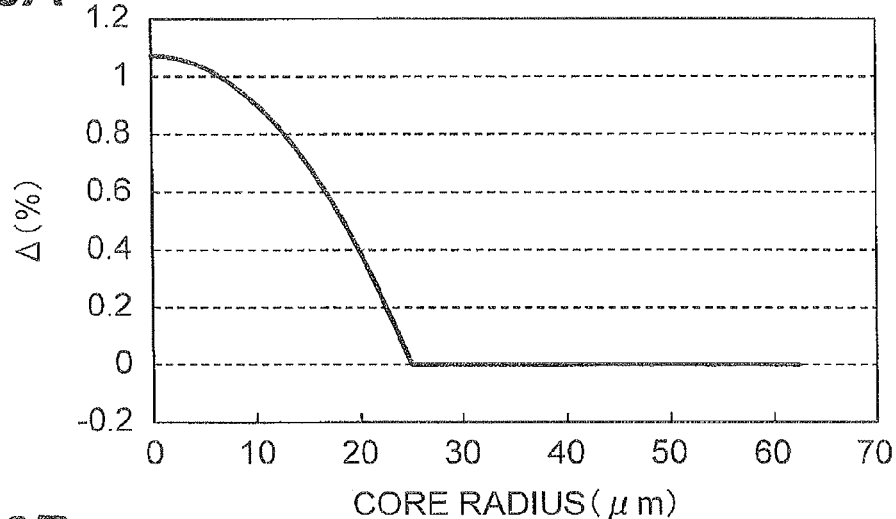
FIG. 6A to FIG. 6C are graphs showing a refractive index profile, theoretical values of pulse power in the DMD measurement, and measured values of pulse power in the DMD measurement, of a GI-MMF sample according to a comparative example.

First, FIG. 6A is a refractive index profile of the GI-MMF of the comparative sample. As shown in FIG. 6A, the comparative sample has the core radius of 25 μm (the core diameter of 50 μm). The relative refractive-index difference $\Delta_{core}$ of the core center to the cladding is 1.07% and the α value for defining the shape of the α-power refractive index profile in the core is 2.06.

Figure 6B:
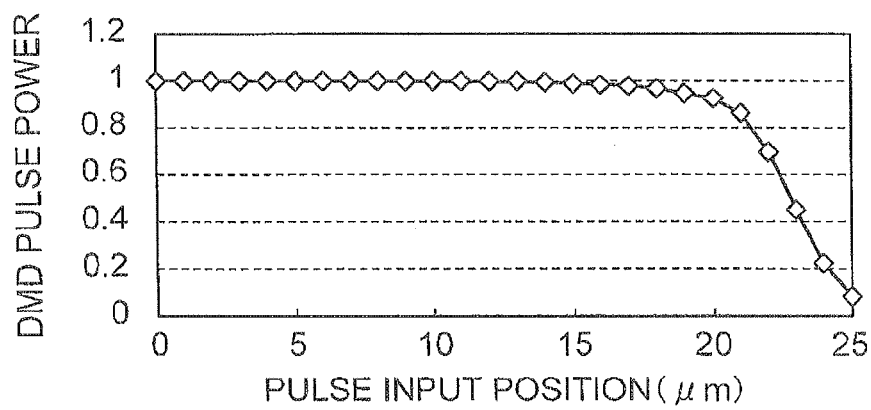
Figure 6C:
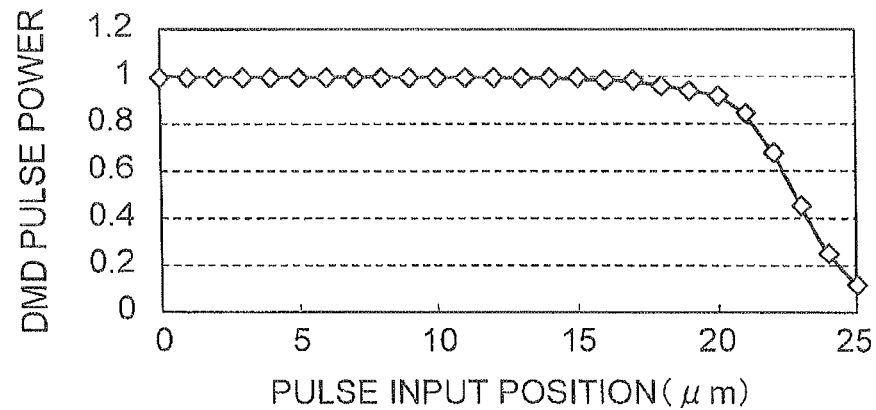

The graph of FIG. 6B shows the calculation results of the DMD measurement for the comparative sample having the structure as described above and theoretical values of relative pulse power in the DMD measurement against core radii. The graph of FIG. 6C shows the actual measurement results of the DMD measurement of the comparative sample and measured values of pulse power in the DMD measurement against core radii. In FIGS. 6B and 6C, the DMD pulse powers (pulse powers measured by the DMD measurement and powers of the measurement pulse on the output end face of the MMF as measured object) are expressed by relative values. Namely, while with incidence of the measurement pulse to the core center (core radius of 0 μm) on the input end face of the comparative sample the power of the measurement pulse on the output end face of the comparative sample (reference value) is defined as 1, the powers of the measurement pulse on the output end face of the sample with incidence of the measurement pulse to the positions other than the core center are expressed by relative values to the foregoing reference value.

As seen from FIGS. 6B and 6C, the comparative sample demonstrates approximate agreement between the theoretical values shown in FIG. 6B and the measured values shown in FIG. 6C. The theoretical values in FIG. 6B are values calculated from coupling ratios from incidence pulse to guided modes and leaky modes of the measurement pulse injected into the comparative sample in execution of the DMD measurement. The reason why the DMD pulse powers become lower in the outside core region (region with the core radii from 20 μm to 25 μm) is that the coupling ratios from guided modes to leaky modes become higher for the measurement pulse injected into the outside core region (outside propagating light).

On the other hand, each of the GI-MMFs 100A prepared as embodiment sample 1 and embodiment sample 2 has the cross-sectional structure and refractive index profile shown in FIGS. 4A and 4B and their basic structure is the same as the GI-MMF 100A of the above comparative sample. Namely, each of the GI-MMFs 100A of embodiment samples 1 and 2 has the core radius of 25 μm (the core diameter of 50 μm). The relative refractive-index difference $\Delta_{core}$ of the core center to the cladding 120A is 1.07% and the α value for defining the shape of the α-power refractive index profile in the core 110A is 2.06. However, each of the embodiment samples 1 and 2 is different from the comparative sample in that each embodiment sample has the structure for attenuating the light propagating at least through the outside core region with the core radii of 20 μm to 25 μm in the core 110A, or, for leaking such outside propagating light from the core to the cladding. Specifically, a preferred structure is one in which a transition metal element is doped in at least a part of the glass region surrounding the outer peripheral surface of the core 110A and being different from the core 110A. In each of the prepared embodiment samples 1 and 2, the cladding is doped with a small amount of Cu; in the embodiment sample 1 the Cu dopant amount in the cladding 120A is 4 ppb; in the embodiment sample 2 the Cu dopant amount into the cladding 120A is 13 ppb. In the case of the BI-MMF 100B in FIGS. 5A and 5B, the glass region doped with the transition metal element includes the trench part 130B, as well as the cladding 120B.

Figure 7:
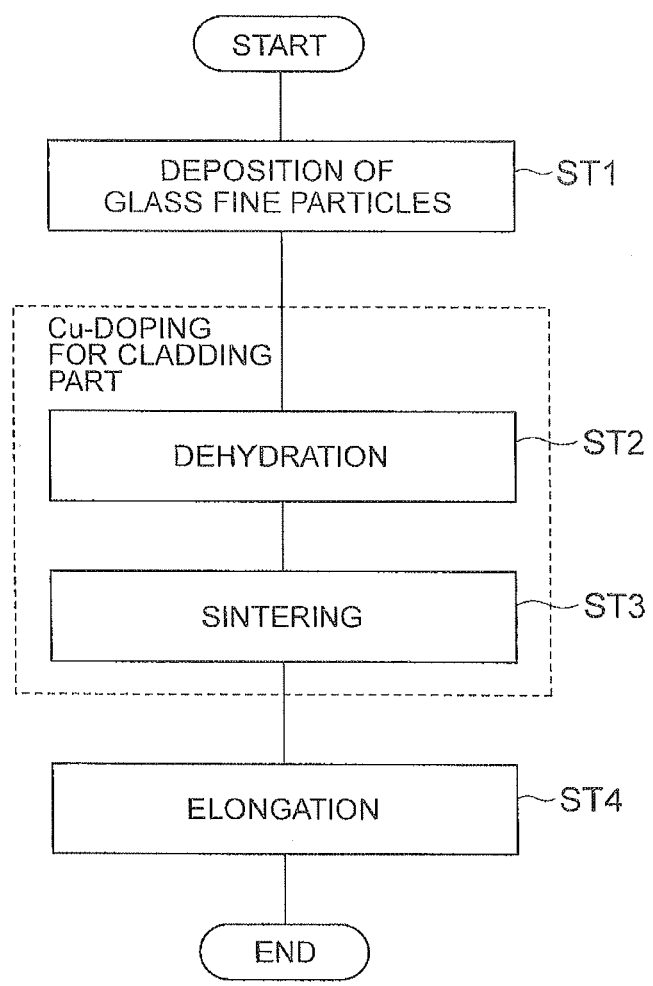
FIG. 7 is a drawing for explaining a preform manufacturing step in processes for manufacturing the GI-MMF and BI-MMF according to the embodiment of the invention.
Figure 8:
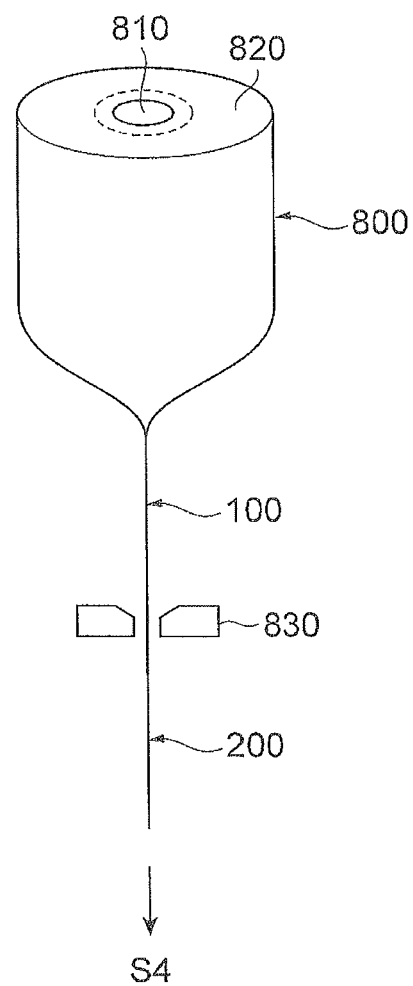
FIG. 8 is a drawing for explaining a drawing step in the processes for manufacturing the GI-MMF and BI-MMF according to the embodiment of the invention.

Doping of Cu into the cladding 120A in the GI-MMFs 100A of embodiment samples 1, 2 is carried out during a step of manufacturing a cladding part in an optical fiber preform for GI-MMFs 100A. Namely, the optical fiber preform for GI-MMFs 100A is manufactured by producing a glass region (core rod) to become the core 110A and thereafter performing deposition of glass fine particles onto the core rod (step ST1), dehydration (step ST2), sintering (step ST3), and elongation (step ST4) according to the flowchart shown in FIG. 7, and then the optical fiber preform with the shape of optical fiber is drawn into fiber. The glass region corresponding to the trench part 130B in the BI-MMF 100B is also manufactured along the flowchart of FIG. 7. FIG. 8 is a drawing for explaining the drawing step for obtaining the GI-MMF 100A and the BI-MMF 100B.

Specifically, the doping of Cu into the cladding 120A is carried out in the process of forming the glass region (cladding part) to become the cladding 120A, on the outer peripheral surface of the prepared core rod. In this process of manufacturing the glass region to become the cladding 120A, fine particles of silica glass are first deposited by VAD (Vapor Phase Axial Deposition) or by OVD (Outside Vapor Deposition) (step ST1). The resulting porous preform is subjected to dehydration (step ST2) and sintering (step ST3) in a dehydration/sintering furnace and on that occasion, a Cu piece as dopant source is intentionally put in the dehydration/sintering furnace, whereby Cu can be mixed in the glass region to become the cladding 120A. Thereafter, the intermediate preform obtained through the dehydration (step ST2) and sintering (step ST3) is elongated to a predetermined outside diameter, thereby obtaining an optical fiber preform 800 for the embodiment samples 1, 2. In the example of FIG. 8, the resultant optical fiber preform 800 is the optical fiber preform for GI-MMF 100A and this is composed of a glass region 810 to become the core 110A, and a glass region 820 to become the cladding 120A. In the optical fiber preform for BI-MMF 100B, a region between a dashed line in FIG. 8 and the outer periphery of the glass region 810 corresponds to a glass region to become the trench part.

Next, as shown in FIG. 8, the resultant optical fiber preform 800 is drawn in a direction indicated by an arrow S4 with one end thereof being heated, thereby manufacturing the MMF 100 corresponding to the GI-MMF 100A or the BI-MMF 100B. The outer peripheral surface of the manufactured MMF 100 is coated with the resin coat 130 by a resin coating device 830, thereby obtaining the coated optical fiber 200.

Figure 9:
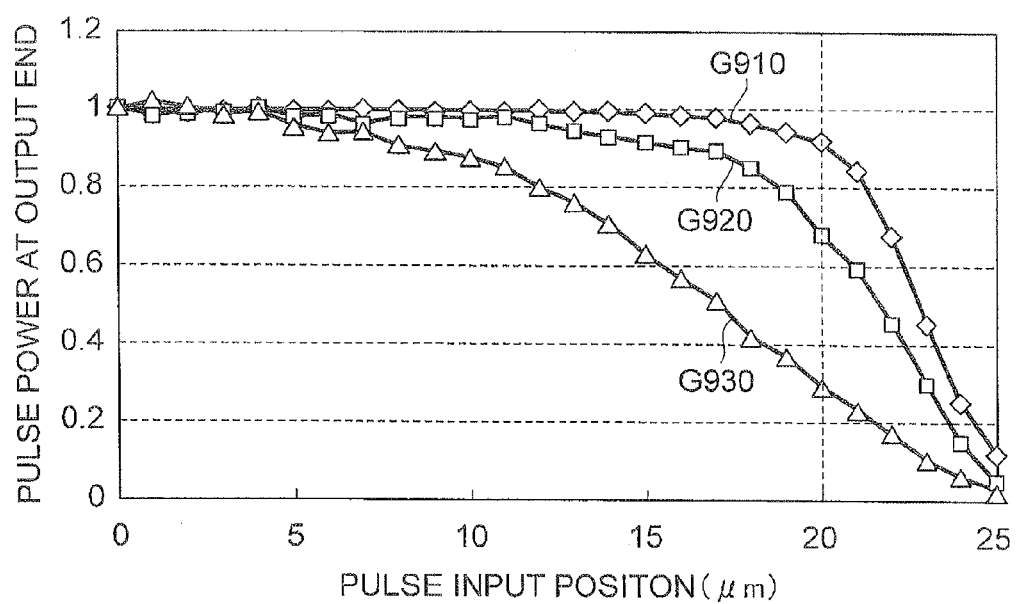
FIG. 9 is graphs showing measured values of pulse power in the DMD measurement with the GI-MMF sample of the embodiment of the invention and the GI-MMF sample of the comparative example.

FIG. 9 is graphs showing relations of pulse input position (input position of the measurement pulse on the input end face of each sample) versus output end pulse power (power of the measurement pulse on the output end face in each sample) in the DMD measurement, as to the GI-MMFs 100A of the respective embodiment samples 1, 2 as described above and the GI-MMF of the comparative sample. In FIG. 9, graph G910 shows the output end pulse powers of the comparative sample, graph G920 the output end pulse powers of the embodiment sample 1 in which the cladding is doped with the small amount of Cu, and graph G930 the output end pulse powers of the embodiment sample 2 in which the cladding is doped with the larger amount of Cu than in the embodiment sample 1. It is noted that the output end pulse powers in FIG. 9 are indicated by relative values as in FIGS. 6B and 6C. Namely, while with incidence of the measurement pulse to the core center (core radius of 0 μm) on the input end face of each sample the power of the measurement pulse on the output end face of the sample (reference value) is defined as 1, the powers of the measurement pulse on the output end face of the sample with incidence of the measurement pulse to the positions other than the core center are expressed by relative values to the foregoing reference value.

As seen from this FIG. 9, the powers of the measurement pulse (outside propagating light) propagating in the outside core region (the region with the core radii of 20 μm to 25 μm) in both of the embodiment samples 1, 2 wherein the cladding 120A is doped with Cu are obviously lower than those in the comparative sample. By comparison between embodiment sample 1 and embodiment sample 2, the powers of the measurement pulse propagating through the outside core region are lower in the embodiment sample 2 with the larger Cu dopant amount than in the embodiment sample 1. For example, in the case of the embodiment sample 1, the output end pulse powers with incidence of the measurement pulse into the outside core region (with the core radii of 20 μm to 25 μm) are not more than 70% of the foregoing reference value. In the case of the embodiment sample 2, the output end pulse powers with incidence of the measurement pulse into the outside core region are not more than 40% of the foregoing reference value. It is understood from this result that in both of the embodiment samples 1, 2 the light propagating through the outside core region is selectively weakened by action of Cu doped in the cladding 120A.

Figure 10:
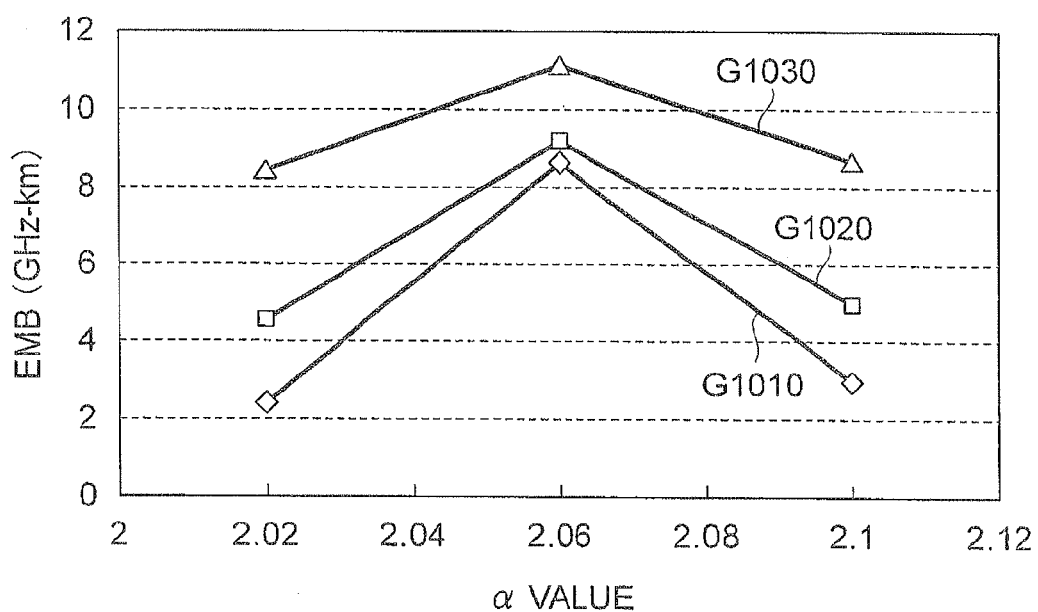
FIG. 10 is graphs showing relations of the α value to determine the shape of the refractive index profile in the core versus EMB (effective modal bandwidth), with the GI-MMF samples of the embodiment of the invention and the GI-MMF of the comparative example.

Furthermore, in order to evaluate superiority of the embodiment of the invention in terms of bandwidth variation and production yield, FIG. 10 shows the theoretical values of EMB at the wavelength 850 nm against multiple α values, as to the GI-MMFs 100A of the respective embodiment samples 1, 2 and the GI-MMF of the comparative sample. In FIG. 10, graph G1010 shows EMB of the comparative sample, graph G1020 EMB of the embodiment sample 1 wherein the cladding is doped with the small amount of Cu, and graph G1030 EMB of the embodiment sample 2 wherein the cladding is doped with the larger amount of Cu than in the embodiment sample 1.

The results shown in FIG. 10 are the theoretical values calculated from the distribution states of output end pulse powers shown in FIG. 9, for each of the comparative sample, the embodiment sample 1, and the embodiment sample 2. The power distribution of measurement pulse calculated for the ordinary GI-MMF of the comparative sample (FIG. 6B) approximately agrees with the intensity distribution of measurement pulse actually measured and thus it is considered that the theoretical values shown in FIG. 10 have no significant difference from measured values, either. The calculation of EMB at the wavelength 850 nm was done on the assumption that the refractive index profile of the core in each sample was the α-power refractive index profile and under each of the conditions of α=2.02, α=2.06, and α=2.1.

As seen from FIG. 10, the optimum value of the α value at the wavelength 850 nm is 2.06 in all the samples. At each α value, the bandwidth is expanded in the embodiment samples 1, 2 compared to the comparative sample. In the cases where the α value deviates from the optimum value (2.06) at the wavelength 850 nm, the comparative sample demonstrates significant degradation of bandwidth. On the other hand, the bandwidth degradation is relieved in each of the embodiment samples 1, 2 compared to the comparative sample. It is understood from this result that the MMF 100 (GI-MMF 100A or BI-MMF 100B) wherein the light propagating through the outside core region is largely attenuated is essentially superior in bandwidth stability to the comparative sample (ordinary GI-MMF).

In the MMF according to the embodiment of the invention, the power of light propagating through the outside region in the core cross section is steeply lowered with respect to the power of light propagating through the center of the core cross section. For this reason, in the case where the shape of the refractive index profile in the core deviates from the shape of the refractive index profile (or where the α value deviates from the optimum value in the manufactured MMF), even if the group delay difference between the inside core region and the outside core region is increased, the influence of the group delay difference of propagating light through the outside core region is suppressed on the transmission bandwidth and, as a result, the dependence of the transmission bandwidth of the MMF on the shape of the refractive index profile of the core is reduced.

From the above description of the present invention, it will be obvious that the invention may be varied in many ways. Such variations are not to be regarded as a departure from the spirit and scope of the invention, and all improvements as would be obvious to those skilled in the art are intended for inclusion within the scope of the following claims.

What is claimed is:

1. A multimode optical fiber comprising:
an input end face;
an output end face opposed to the input end face;
a core with an outside diameter 2a extending from the input end face to the output end face and having an α-power refractive index profile; and
a cladding provided on an outer peripheral surface of the core,
wherein, when an input position of a DMD measurement pulse on the input end face is represented by a distance r from a center of the core,
a power of the DMD measurement pulse on the output end face with the input position r of the DMD measurement pulse being 0.8a is not more than 70% of a power of the DMD measurement pulse on the output end face with the input position r of the DMD measurement pulse being 0.

2. The multimode optical fiber according to claim 1, wherein the power of the DMD measurement pulse on the output end face with the input position r of the DMD measurement pulse being 0.8a is not more than 40% of the power of the DMD measurement pulse on the output end face with the input position r of the DMD measurement pulse being 0.

3. The multimode optical fiber according to claim 1, having the following optical characteristics at the wavelength 850 nm: an OFL bandwidth of not less than 1500 MHz·km; and an effective modal bandwidth EMB of not less than 2000 MHz·km.

4. The multimode optical fiber according to claim 3, wherein the OFL bandwidth is not less than 3500 MHz·km and the effective modal bandwidth EMB is not less than 4700 MHz·km.

5. The multimode optical fiber according to claim 1, having the following optical characteristic at the wavelength 850 nm: an effective modal bandwidth EMB of not less than 4700 MHz·km; and having the following optical characteristic at the wavelength 950 nm: the effective modal bandwidth EMB of not less than 2700 MHz·km.

6. The multimode optical fiber according to claim 1, having the following optical characteristic at any one of the wavelengths 980 nm, 1060 nm, and 1300 nm: an OFL bandwidth of not less than 1500 MHz·km.

7. The multimode optical fiber according to claim 1, having the following optical characteristic at any one of the wavelengths 980 nm, 1060 nm, and 1300 nm: an OFL bandwidth of not less than 3500 MHz·km.

8. The multimode optical fiber according to claim 1, having a structure for attenuating light propagating at least through an outside core region with radii of 0.8a to a in the core, or, for leaking the light from the core into the cladding.

9. The multimode optical fiber according to claim 1, wherein at least a part of a glass region surrounding the outer peripheral surface of the core and being different from the core is doped with a transition metal element.

10. An optical cable inside which at least one optical fiber having the same structure as the multimode optical fiber as set forth in claim 1 is enclosed.

11. A multimode optical fiber comprising:
an input end face;
an output end face opposed to the input end face;
a core with an outside diameter 2a extending from the input end face to the output end face and having an α-power refractive index profile;
a cladding provided on an outer peripheral surface of the core; and
a trench part provided between the core and the cladding and having a lower refractive index than the cladding,
wherein, when an input position of a DMD measurement pulse on the input end face is represented by a distance r from a center of the core,
a power of the DMD measurement pulse on the output end face with the input position r of the DMD measurement pulse being 0.8a is not more than 70% of a power of the DMD measurement pulse on the output end face with the input position r of the DMD measurement pulse being 0.

12. The multimode optical fiber according to claim 11, wherein the power of the DMD measurement pulse on the output end face with the input position r of the DMD measurement pulse being 0.8a is not more than 40% of the power of the DMD measurement pulse on the output end face with the input position r of the DMD measurement pulse being 0.

13. The multimode optical fiber according to claim 11, having the following optical characteristics at the wavelength 850 nm: an OFL bandwidth of not less than 1500 MHz·km; and an effective modal bandwidth EMB of not less than 2000 MHz·km.

14. The multimode optical fiber according to claim 13, wherein the OFL bandwidth is not less than 3500 MHz·km and the effective modal bandwidth EMB is not less than 4700 MHz·km.

15. The multimode optical fiber according to claim 11, having the following optical characteristic at the wavelength 850 nm: an effective modal bandwidth EMB of not less than 4700 MHz·km; and having the following optical characteristic at the wavelength 950 nm: the effective modal bandwidth EMB of not less than 2700 MHz·km.

16. The multimode optical fiber according to claim 11, having the following optical characteristic at any one of the wavelengths 980 nm, 1060 nm, and 1300 nm: an OFL bandwidth of not less than 1500 MHz·km.

17. The multimode optical fiber according to claim 11, having the following optical characteristic at any one of the wavelengths 980 nm, 1060 nm, and 1300 nm: an OFL bandwidth of not less than 3500 MHz·km.

18. The multimode optical fiber according to claim 11, having a structure for attenuating light propagating at least through an outside core region with radii of 0.8a to a in the core, or, for leaking the light from the core into the cladding.

19. The multimode optical fiber according to claim 11, wherein at least a part of a glass region surrounding the outer peripheral surface of the core and being different from the core is doped with a transition metal element.

20. An optical cable inside which at least one optical fiber having the same structure as the multimode optical fiber as set forth in claim 11 is enclosed.

* * * * *